United States Patent [19]

Buzzelli

[11] Patent Number: 5,004,534
[45] Date of Patent: Apr. 2, 1991

[54] CATCH BASIN

[76] Inventor: Vincenzo Buzzelli, 226 Terrace Ave., Jersey City, N.J. 07307

[21] Appl. No.: 194,548

[22] Filed: May 16, 1988

[51] Int. Cl.⁵ .............................................. B01D 21/00
[52] U.S. Cl. .................................... 210/164; 210/521; 210/532.1
[58] Field of Search .............................. 210/163–166, 210/170, 513, 521, 522, 532.1

[56] References Cited

U.S. PATENT DOCUMENTS

| | | | |
|---|---|---|---|
| 325,231 | 9/1885 | Badgley | 210/163 X |
| 574,760 | 1/1897 | Pierce | 210/163 |
| 640,077 | 12/1899 | Bagby | 210/521 X |
| 732,778 | 7/1903 | Peters | 210/164 |
| 832,463 | 10/1906 | Engelbrecht | 210/532.1 X |
| 965,832 | 7/1910 | Nicholas | 210/163 |
| 1,035,480 | 8/1912 | Schodde | 210/163 X |
| 1,161,197 | 11/1915 | Corwin | 210/532.1 X |
| 1,648,701 | 11/1927 | Smallbrook | 210/532.1 X |
| 1,664,853 | 4/1928 | Firth | 210/532.1 |
| 1,675,714 | 7/1928 | Koch | 210/163 X |
| 1,681,117 | 8/1928 | Howcott | 210/164 X |
| 2,095,024 | 10/1937 | Boosey | 210/165 X |
| 2,237,545 | 4/1941 | Boosey | 210/513 X |
| 3,042,210 | 7/1962 | Hattori | 210/163 |
| 3,272,343 | 9/1966 | Caldwell | 210/521 |
| 3,815,748 | 6/1974 | Johannessen | 210/163 |
| 4,136,012 | 1/1979 | Louboutin et al. | 210/521 X |
| 4,326,952 | 4/1982 | Blake | 210/532.1 X |

FOREIGN PATENT DOCUMENTS

| | | | |
|---|---|---|---|
| 3316475 | 11/1984 | Fed. Rep. of Germany | 210/163 |
| 619853 | 4/1927 | France | 210/522 |
| 919999 | 4/1982 | U.S.S.R. | 210/521 |
| 1000060 | 3/1983 | U.S.S.R. | 210/521 |

Primary Examiner—Robert Spitzer
Attorney, Agent, or Firm—Frank Cozzarelli, Jr.

[57] ABSTRACT

The invention describes a catch basin having an inlet zone and an outlet zone separated by a vertical baffle wherein:

(i) the vertical baffle is positioned in such a manner that liquid is permitted to flow from the bottom of the inlet zone to the bottom of the outlet zone;

(ii) the vertical baffle provides an inner wall for the outlet zone; and (iii) the outlet zone has an outer wall parallel to the vertical baffle, the outer wall having an outlet port at its upper end, the improvement comprising:

locating a series of at least three alternating baffles in the outlet zone, these alternating baffles being parallel, and bearing a spaced relationship, to each other; the even numbered baffles in the series being attached at right angles to the vertical baffle; the odd numbered baffles in the series being attached at right angles to the outer wall; and each baffle in the series extending just beyond the midpoint between the vertical baffle and the outer wall, the first baffle in the series being attached to the bottom of the vertical baffle and the last baffle in the series being attached to the vertical baffle at a point below an imaginary line running from the bottom of the outlet port to the vertical baffle, the imaginary line being parallel to the alternating baffles.

4 Claims, 2 Drawing Sheets

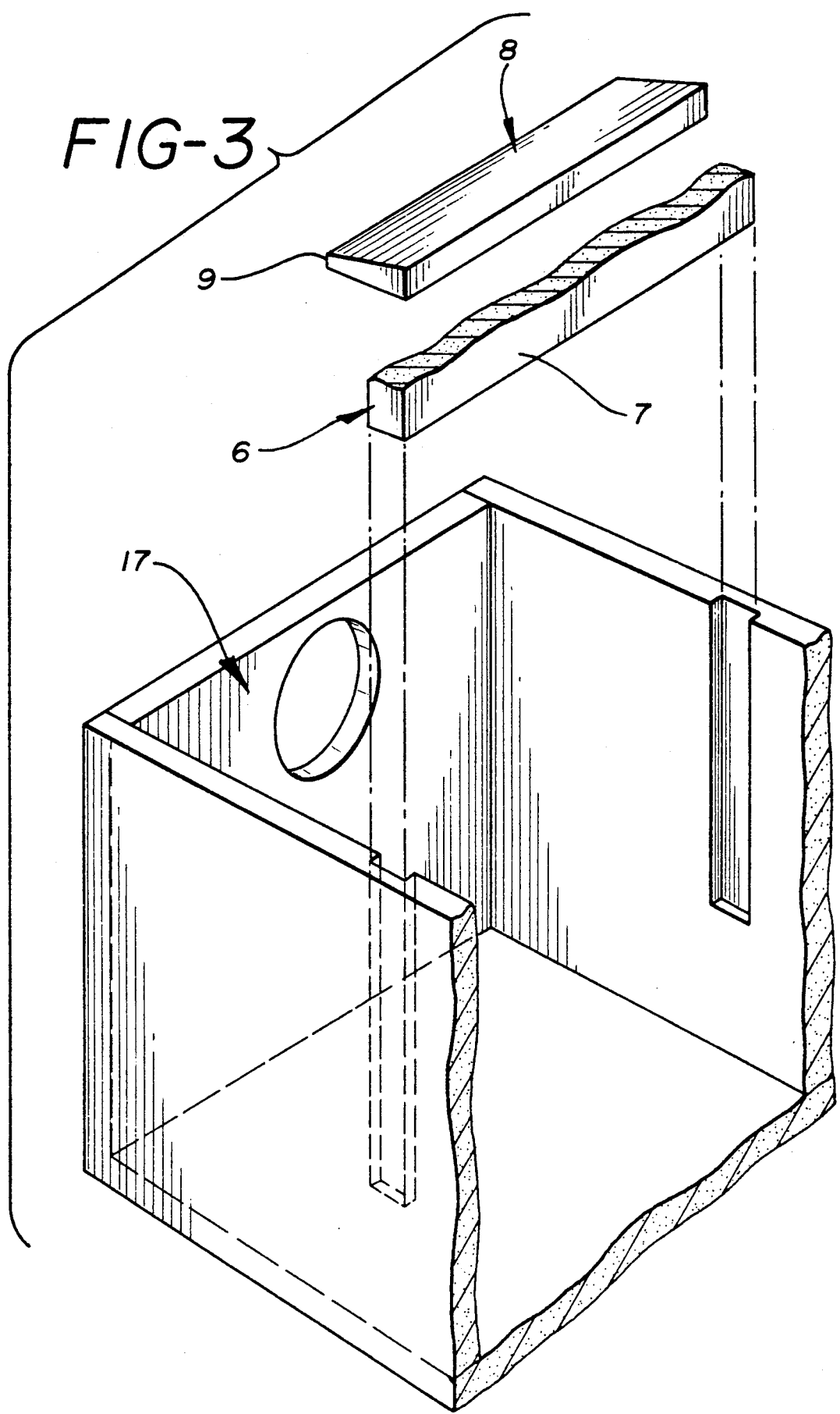

CATCH BASIN

This invention relates to an improved catch basin for use either by itself or in combination with existing catch basins which are commonly used as part of sewer systems. Catch basins are well known to all; however, those typically found in use in cities or in industrial applications do not discharge a clear effluent from the catch basin to the sewer piping. Solid material is swept into the discharge and then into the piping system which eventually plugs. Consequently, the piping must be cleaned to restore it to service.

BACKGROUND OF THE INVENTION

The present invention relates to catch basins that are typically implanted in the ground for collecting solids-containing rain, surface water or effluent and which are further connected to below-ground sewer piping systems which carry the effluent away from the catch basin to some central sewage processing system.

Catch basins are usually constructed of concrete or concrete block, are rectangular in cross section and have an open top adapted to receive a metal inlet grate.

The catch basin and associated inlet and discharge piping are usually adequate in size and design to accept and carry away water runoff containing solids without overflowing. However, when the piping system or catch basin discharge is filled with solids, it overflows causing a health hazard and stops functioning.

The design of a conventional catch basin does not include any means to clarify the solids-containing water runoff or effluent. Consequently, a disadvantage of these catch basins is that the contained dirt, leaves, paper, plastics, and various other solids, are swept into the catch basin and then are carried through the outlet into the sewer piping system. Eventually, these lines and catch basins plug and have to be cleaned out. When plugged, the surface area or street around the inlet grating is flooded causing a health hazard due to the contained materials and polluted liquid.

Another disadvantage is that there is no positive means of preventing sewer gases from escaping from the sewer system and out of the catch basin into the atmosphere. These gases can be poisonous and at minimum have a foul odor.

These disadvantages were vividly described in an editorial in the Nov. 27, 1987 issue of the New York Times which stated that during August, 1987 a 50-mile slick carrying used hospital syringes, bags of household trash and thousands of empty dope (crack) bottles were washed on to the New Jersey shore. The source was later proven to be New York City. Another major pollutant, besides illegal dumping, is the trash left on city streets. In many cities, sewers and storm drains are combined, allowing storm runoff to bypass treatment plants in times of high flow. Thus, during almost every storm the water sweeps uncollected city trash through the sewer system out to sea or to some other body of water to cause problems at some other point of the shoreline.

In U.S. Pat. No. 1,664,853 issued Aug. 3, 1928, the inventor describes a device for use in conjunction with street inlets associated with catch basins. A cylindrical sieve container is included in the catch basin to collect the solids contained in surface runoff. The disadvantage of that system is that such a container does not prevent all of the solid material from flowing into the sewer system. Material smaller in size than the container openings will flow through and into the sewer piping. Another disadvantage is that the container will eventually corrode. Another disadvantage is that the container must be removed to empty it—a difficult job at best.

An advantage of the catch basin of the present invention is that it includes separating baffles arranged so that solid material contained in the water runoff is retained, for later manual removal, in the catch basin. Another advantage is that because of the relative positions of the inlet and outlet of the catch basin and the separating baffles a liquid seal is maintained in the catch basin and sewer gases cannot flow backward out of the sewer piping through the catch basin and to the atmosphere. Another advantage is that the catch basin of the present invention may be used by itself or in conjunction with existing catch basins and sewer systems. It can also be used in municipalities at the curb or in open areas or along highways as well as in the industrial environment.

SUMMARY OF THE INVENTION

An object of this invention, therefore, is to provide an improvement in catch basins which is capable of removing solids from water runoff, sewage, effluent and the like thus providing clarified effluent for collection in sewer systems in order to minimize sewer pipe plugging and cleaning.

Another object is to provide a catch basin in which sewer gases are prevented from flowing backward from the sewer piping through the catch basin and into the atmosphere to minimize that health hazard.

Other objects and advantages will become apparent hereinafter.

According to the present invention, an improvement has been discovered in a catch basin:

(a) having an inlet zone and an outlet zone; at least three clarifying compartments in between, connected in series, separated by baffles, and positioned in such a manner that the first clarifying compartment in the series, is adjacent and connected to the inlet zone and the last clarifying compartment in series is adjacent and connected to the outlet zone; and (b) with a solids retaining zone at the bottom of and inside the catch basin. The improvement comprises:

(1) positioning the inlet zone and the outlet zone in such a manner that the solids containing effluent is permitted to flow through the inlet zone, then through and to the bottom o f the first clarifying compartment in the series and from the top of the last clarifying compartment in the series to the outlet zone; and (2) utilizing for a first baffle, a baffle comprised of two parts, a first baffle inlet projecting perpendicularly downward from the end of the inlet closest to the outlet and a second baffle positioned at a right angle to the bottom end of the first baffle and extending horizontally toward the outlet side and also parallel to the bottom of the catch basin; and a third baffle extending horizontally from the outside of the catch basin toward the first baffle and bearing a spaced relationship and parallel to the second baffle; and a fourth baffle extending horizontally from the first baffle toward the outlet side of the catch basin and bearing a spaced relationship and parallel to the third baffle and positioned in such a manner that (i) the first baffle is on the inlet side of the catch basin and the second, third and fourth separating baffles are on the outlet side of the catch basin, and the third baffle being positioned between the second baffle and the fourth baffle and parallel to both the second baffle and also parallel to the bottom of the catch basin, and the fourth baffle being positioned between and parallel to the third baffle and the outlet of the catch basin; and (ii) effluent is permitted to flow downward from the inlet zone, through the first clarifying compartment into the space between the end of the first baffle and the bottom of the catch basin and then parallel to the second baffle and then upward toward and essentially at right angles to the second and third baffle which diverts the effluent flow around the edge of the third baffle to the fourth baffle and around the edge of the fourth baffle to the top of the outlet zone and then the clarified effluent flows out of the outlet zone to and out of the outlet of the catch basin while the solids, removed from the effluent flowing through the catch basin and by the action caused by the baffles, settle to, and are retained at, the bottom of the catch basin in the solids retaining zone, and (iii) due to the liquid seal resulting from the liquid level maintained between the inlet zone and the outlet zone sewer gases are prevented from flowing backward from the sewer system, through the outlet zone of the improved catch basin, then through the inlet zone of the improved catch basin and finally to the atmosphere.

The improved catch basin is achieved by providing in a catch basin for the removal of solid material from sewage, water runoff or effluent and the prevention of sewer gas from flowing backward out of the catch basin through the inlet zone, comprising, in combination:

(a) a catch basin having four compartments: a first clarifying compartment, a second clarifying compartment, a third clarifying compartment and outlet compartment wherein the following baffles, which permit the flow of solids-containing effluent to flow from one compartment to another, are present as follows: vertical baffle 6 separating the first clarifying compartment from the second and third clarifying compartments and the outlet compartment; baffle 8 separating the solids retaining zone from the second clarifying compartment; baffle 10 separating the second clarifying compartment from the third clarifying compartment; and baffle 12 separating the third clarifying compartment from the outlet compartment, the improvement comprising positioning the baffles as follows:

vertical baffle 6 is positioned in such a manner that solids containing effluent is permitted to flow through and to the bottom of the inlet zone, then to the bottom of the first clarifying compartment;

baffle 8 is the first baffle positioned at a right angle to the lower end of the vertical baffle 6 and parallel to the bottom of the catch basin and is positioned in such a manner that partially clarified effluent is permitted to flow from the bottom of the first clarifying compartment, and parallel to the second baffle, diverted around the edge of the second baffle and to the inlet to the second clarifying compartment; baffle 10 has a spaced relationship to baffle 8 and is positioned in such a manner that the partially clarified effluent is permitted to flow through the second clarifying compartment around the edge of baffle 10 and into the inlet of the third clarifying compartment; baffle 12 is positioned in such a manner that the clarified effluent is permitted to flow from the outlet of the third clarifying compartment around the edge of baffle 12 and finally to the outlet zone, through the outlet and into the sewer system, not shown.

Due to the liquid seal resulting from the liquid level maintained between the inlet zone and the outlet zone by the positioning of the separating baffles, sewer gases are prevented from flowing backward from the sewer system through the outlet zone of the improved catch basin, then through the inlet zone of the improved catch basin and finally to the atmosphere.

BRIEF DESCRIPTION OF THE DRAWINGS

FIG. 3 is an exploded view partially broken away to show the baffle assembly.

DETAILED DESCRIPTION OF THE INVENTION

Figure 1:
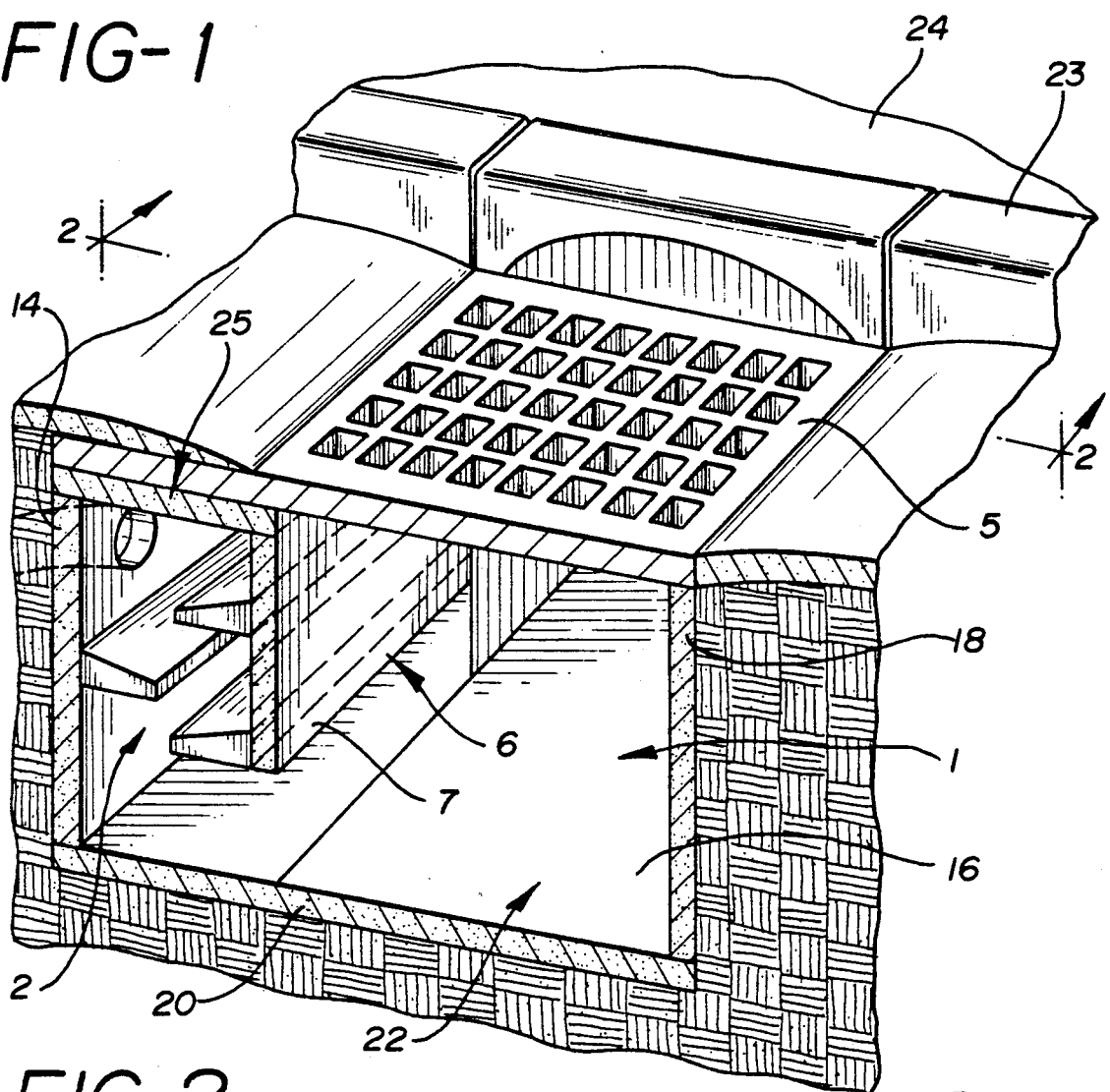
FIG. 1 is a perspective view of the catch basin with the front face in cross section showing the baffle arrangement.

The first step in achieving the defined improvement was to determine what limits the clarifying capability of known catch basin designs. It was found that one limitation is when effluent, surface water runoff, and the like containing solids enter the inlet of catch basins but since the outlet of the catch basin is located at the lower end of a catch basin side, the solids are swept into the catch basin outlet and into the sewer system piping. Eventually, the sewer lines are plugged which causes the effluent to overflow the catch basin on to the surrounding surface, pavement or sidewalk. Subsequently, the catch basin and sewer piping must be pumped out and cleaned to make the catch basin functional and to be able to again carry away effluent containing solid material. A sewer system and, in particular, a catch basin which is plugged, is a health hazard to the community, because it overflows and spills the polluted contents all over the adjacent surface. Another concern with known catch basin designs is that there is no liquid seal to prevent the backflow of sewer gas out of the catch basin.

Figure 2:
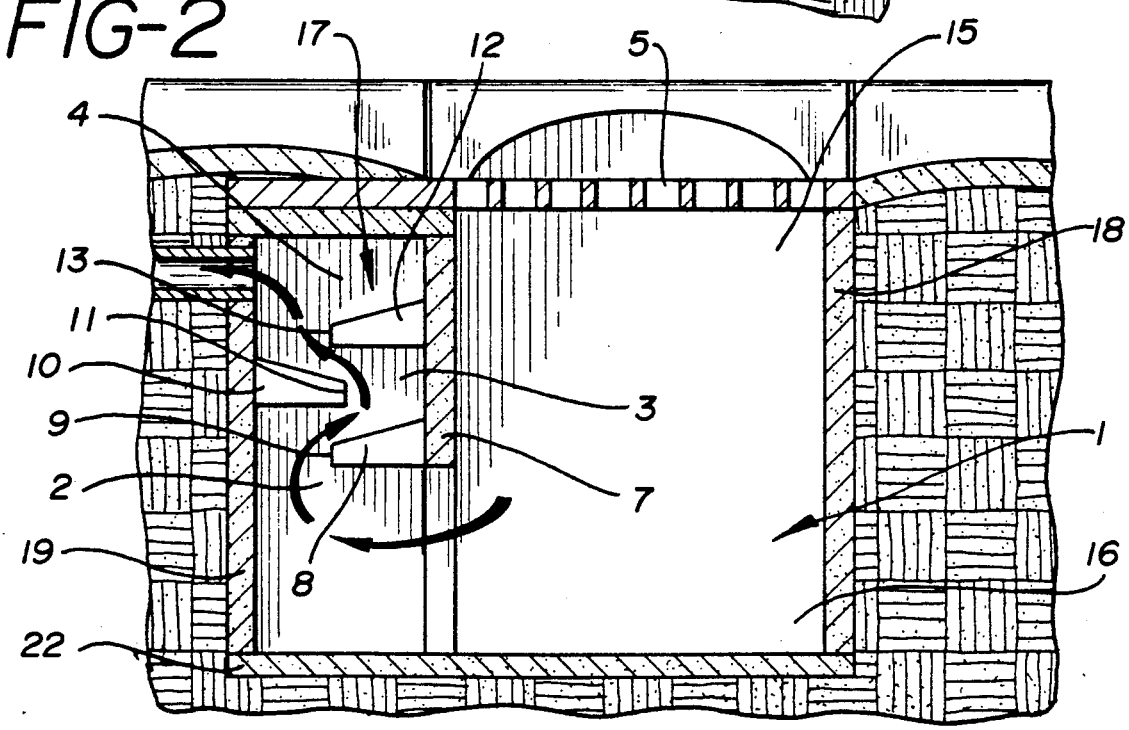
FIG. 2 is a cross sectional view of the catch basin taken along Section 2—2 of FIG. 1 and shows the liquid flow relative to the baffles.

Referring to the drawings:

FIGS. 1, 2 and 3 show a catch basin having a rectangular cross section. FIG. 1 and 2 show a catch basin in the shape of a rectangular prism having four outer walls 18, 19, 20, and 21 (not shown) a top 25 with an inlet grating 5 and a bottom wall 22 and baffles separating the catch basin into four compartments. Catch basins are constructed of a variety of shapes; however, the improved design shown is for a catch basin of rectangular cross section but the improvement is not limited to that shape. Other configurations may incorporate the improved design, such as but not limited to, a square, circular or oval cross sections. Typically, the outer side walls 18, 19, 20 and 21 may be made of cement block or steel rod reinforced concrete. The catch basin is shown on FIGS. 1 and 2 as it typically fits below grade into a curb 23 and sidewalk 24.

Catch basins may also have a top 25 usually constructed of steel rod, reinforced concrete and an inlet grating 5, usually constructed of steel of sufficient thickness and design to withstand the weight of cars and trucks which may roll over the inlet grating or the top of the catch basin 25. The baffles 6, 8, 10, and 12 are constructed of concrete reinforced with steel rods. Usually one half inch diameter reinforcing steel rods are used. In relation to the path of the effluent, the inlet zone comprises the first clarifying compartment 1, which includes inlet grating 5 and vertical baffle 6. The second clarifying compartment 2 comprises the zone formed by baffle 8 and baffle 10. The third clarifying compartment 3 comprises the zone formed by baffle 10, and baffle 12. The outlet compartment 4, comprises the zone formed by baffle 12 and outlet 14. The solids retaining zone 16 is formed by the bottom 22, the lower portion of side walls 18, 19, 20 and 21 (not shown) below the terminal end of vertical baffle 6 and baffle 8.

The flow of the effluent through the improved catch basin is represented by arrows as shown on FIG. 2. Effluent, containing solids both heavier and lighter than water, enters first clarifying compartment 1 through inlet grating 5 flows downward through inlet zone 15 through and to the bottom of inlet compartment 1 and into solids retaining zone 16 where solids fall out and are held. The effluent with the remaining solids changes direction and flows horizontally past first baffle lip 7. This change in direction also causes more solids to fall out and be collected in solids retaining zone 16 for later manual removal. The partially clarified effluent flows horizontally and parallel to baffle 8 in the space formed by baffle 8 and the bottom 22 of the catch basin. The partially clarified effluent changes direction again and now flows upward into second clarifying compartment 2 around second baffle lip 9 and in the space formed between the outer side wall 19 and the second baffle lip 9. The area for flow in the space below the vertical baffle 6 and the catch basin bottom 22 is about eight times greater than the area for flow in the space between outer side wall 19 and the second baffle lip 9. Therefore, this restriction along with the previously mentioned change in flow direction causes more solids to fall out and to be retained in solids retaining zone 16. The partially clarified effluent then flows at about a right angle to third baffle 10 which in turn causes another change in direction to a horizontal flow toward the back of first vertical baffle 6 and then the effluent changes direction once again and flows around third baffle lip 11 into third clarifying compartment 3 and is directed toward the bottom of fourth baffle 12. Again the further clarified effluent changes direction and flows toward the outer side wall 19 and around fourth baffle lip 13 and leaves third clarifying compartment 3. The clarified effluent now flows vertically upward and parallel to outer side wall 19 into outlet compartment 4 and then flows out of the catch basin through outlet 14 and into the sewer piping and collection system, not shown. The path of the effluent through the second clarifying compartment 2, the third clarifying compartment 3 and into the outlet compartment 4 causes the remaining solids to be left behind and to settle into the solids retaining zone 16. A further obstruction to the flow of solids is caused by the overlapping of baffle lips 9, 11 and 13 which is four inches in the preferred design.

When the solids retaining zone 16 is so compacted with solid material that only liquid seepage gets through to the outlet 14 then the solids will have to be manually removed. An advantage of the improved catch basin is that it would take years before a catch basin in common street service would have to be cleaned out. Another advantage with the use of the improved catch basin, is that the sewer piping will not plug up and therefore not require any cleaning. Thus, the cleaning operation in the improved catch basin design is placed in an accessible spot—at the catch basin—rather than in the sewer lines which are difficult to clean out. Another advantage of the improved catch basin is that the arrangement of the vertical baffle 6 and the location of the catch basin outlet 14, which is at the upper portion of the sidewall 19, results in forming a liquid seal which does not allow any sewer gases to flow backward through outlet 14 downward through the outlet compartment, through the third clarifying compartment 3, through the second clarifying compartment 2, through the first clarifying compartment 1, and finally through the inlet grating 5 and into the atmosphere. The liquid seal is also due to the sealing of vertical baffle 6 to the top 25, and at both side walls 20 and 21. The sewer gas does not have sufficient pressure to overcome the liquid head in the catch basin which is at least ninety (90) inches of liquid or over 3.3 psig in the preferred improved catch basin dimensions and size.

The drawings depict an improved catch basin of the type suitable for installation below grade at a curb side location. This is not meant to be a limitation on the construction, because the improved catch basin can be installed below grade in an open area without a curb or sidewalk. Various cross sectional configurations may be used. Usually the catch basin grating inlet is depressed below grade by several inches and with sloping surfaces to the inlet grating to facilitate the flow of surface water drainage. This is true whether or not the catch basin is located at curbside or elsewhere.

Solids heavier than water such as sand or dirt, and those lighter than water such as leaves and even some plastics such as polyethylene, for example, are retained in the improved catch basin of the present design.

The following example illustrates the invention:

The improved catch basin described above and in the drawings is preferably constructed according to the following dimensions. See FIGS. 1, 2, and 3.

(i) the internal dimensions of the catch basin are: 12 feet in depth, 6 feet 4 inches in length and 2 feet in width including an inlet grating having a length of 4 feet and a width of 2 feet and a thickness of 2-3 inches. The sidewalls 18, 19, 20 and 21 are 8 inches thick and the bottom 22 is 1 foot thick with one half inch diameter steel reinforcing rods;

(ii) the first vertical baffle 6 perpendicular to one end of the inlet grating closest to the outlet is 6 feet 9 inches in length by 3 feet in width, with 2 feet being exposed to flow, and 8 inch thick concrete reinforced with one half inch diameter steel rods and of a rectangular configuration. The clearance or space between the terminal end of the first separating baffle and the bottom of catch basin is 5 feet 3 inches;

(iii) the second baffle 8 is of a trapezoidal cross section 1 foot wide, 1 inch thick at one end and five inches thick at the opposite end and with a sloping side being 12¾ inches in length and a baffle length of 3 feet, with 2 feet being exposed to flow, constructed of concrete with steel reinforcing rods of one half inch diameter;

(iv) baffles 10 and 12 are of the same dimensions and construction as baffle 8;

(v) the clearance of baffle 8 between baffle lip 9 and the sidewall 19 is 8 inches;

(vi) the clearance of baffle 12 between baffle lip 13 and the side wall 19 is 8 inches;

(vii) the clearance of baffle 10 between baffle lip 11 and separating baffle 8 is 8 inches;

(viii) the clearance or vertical spacing of baffle 8 and baffle 10 and of baffle 10 and baffle 12 is 10 inches;

(ix) baffle 10 horizontally overlaps baffle 8 by four inches and baffle 12 overlaps baffle 10 by four inches;

(x) the internal vertical clearance from the top 25 of the catch basin and the outlet 14 is 3 feet and the outlet is 18 inches in diameter;

(xi) the inlet grating design may be of the standard, removable designs commonly available from Campbell Foundry Co., Harrison, N.J. 07029;

(xii) a manhole and cover may or may not be included above the three baffles 8, 10, and 12 at outlet zone 14, however if included it must be vapor tight;

(xiii) solids retaining zone 16 is rectangular in cross section and is 6 feet 4 inches in length by 2 feet in width by 5 feet 3 inches in height for a volume of 66.5 cubic feet in which to collect solids.

The improved catch basin of the present design when in operation will normally have a liquid level or depth of 7 feet 7 inches with the level in the inlet zone or first clarifying compartment 1 being essentially the same as in the outlet compartment 4, the difference between these two levels being equal to the pressure drop through the baffled areas. The effluent merely overflows into the outlet 14 and is not under any substantial liquid head or pressure.

The dimensions shown are merely illustrative of the preferred embodiment and not intended to be limited to these values.

In a scaled model of the improved catch basin of the present design a slurry of sand and water varying in concentrations of 50 percent by weight of sand down to 2 percent by weight of sand was fed at rates of 3 to 5 gallons per minute into the inlet of the model and after steady flow was established the outlet flow was essentially 3 to 5 gallons per minute of clear water containing a trace of sand about 0.03 weight percent.

Light solids such as leaves or polyethylene film typically used for plastic bags did not exit the catch basin model. Neither will these materials flow out of the full sized improved catch basin.

What is claimed is:

1. In a catch basin having an inlet zone and an outlet zone separated by a vertical baffle wherein:
   (i) the vertical baffle is positioned in such a manner that liquid is permitted to flow from the bottom of the inlet zone to the bottom of the outlet zone;
   (ii) the vertical baffle provides an inner wall for the outlet zone; and
   (iii) the outlet zone has an outer wall parallel to the vertical baffle, said outer wall having an outlet port at its upper end, the improvement comprising;
   locating a series of at least three alternating baffles in the outlet zone, said alternating baffles being parallel, and bearing a spaced relationship, to each other; the odd numbered baffles in the series being attached at right angles to the vertical baffle; the even numbered baffles in the series being attached at right angles to the outer wall; and each baffle in the series extending just beyond the midpoint between the vertical baffle and the outer wall, the first baffle in the series being attached to the bottom of the vertical baffle and the last baffle in the series being attached to the vertical baffle at a point below an imaginary line running from the bottom of the outlet port to the vertical baffle, said imaginary line being parallel to the alternating baffles.

2. The catch basin defined in claim 1 wherein the space between adjacent alternating baffles, as measured at the midpoint, defines a cross section, which is at least as large as the cross section of the outlet port.

3. The catch basin defined in claim 1 wherein the upper side of each alternating baffle slopes downward toward the midpoint.

4. The catch basin defined in claim 1 wherein there are two odd numbered alternating baffles and one even numbered baffle.

* * * * *